United States Patent
Fujiyoshi et al.

(10) Patent No.: US 8,653,836 B2
(45) Date of Patent: Feb. 18, 2014

(54) COORDINATE DETECTING DEVICE

(75) Inventors: Tatsumi Fujiyoshi, Miyagi-ken (JP);
Naoyuki Hatano, Miyagi-ken (JP);
Hiroshi Izumi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 171 days.

(21) Appl. No.: 13/438,332

(22) Filed: Apr. 3, 2012

(65) Prior Publication Data
US 2012/0256644 A1 Oct. 11, 2012

(30) Foreign Application Priority Data
Apr. 5, 2011 (JP) ................................. 2011-083320

(51) Int. Cl.
*G01R 27/26* (2006.01)
(52) U.S. Cl.
USPC ................ 324/679; 701/22; 701/45
(58) Field of Classification Search
None
See application file for complete search history.

(56) References Cited

U.S. PATENT DOCUMENTS 3,764,813 A * 10/1973 Clement et al. ............... 250/221
7,940,063 B2 * 5/2011 Shimizu et al. ................ 324/713

FOREIGN PATENT DOCUMENTS

JP 3-289715 12/1991

* cited by examiner

*Primary Examiner* — Jermele M Hollington
*Assistant Examiner* — Trung Nguyen
(74) *Attorney, Agent, or Firm* — Brinks Gilson & Lione

(57) ABSTRACT

A coordinate detecting device includes a plurality of first electrodes, a plurality of second electrodes, a capacitance detecting circuit, a first electrode switch, and a second electrode switch. All of the second electrodes are connected to a power supply by the second electrode switch and the first electrodes are selectively connected to the capacitance detecting circuit by the first electrode switch, thereby detecting a first coordinate. All of the first electrodes are connected to the power supply by the first electrode switch and the second electrodes are selectively connected to the capacitance detecting circuit by the second electrode switch, thereby detecting a second coordinate. When a plurality of first coordinates or a plurality of second coordinates are detected, capacitances between the first and second electrodes corresponding to combinations of the detected first and second coordinates are measured, thereby specifying the position of the detection target.

4 Claims, 14 Drawing Sheets

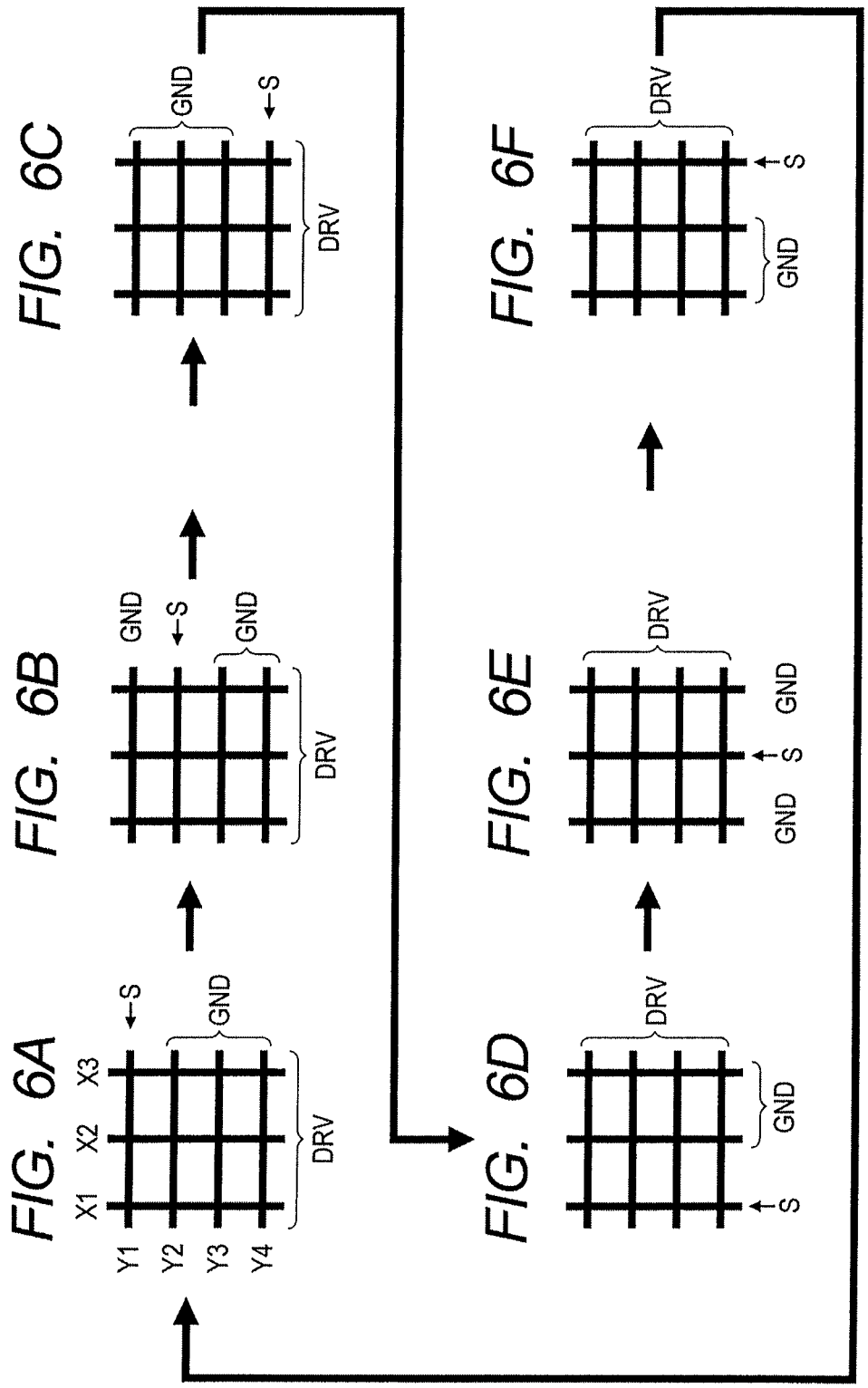

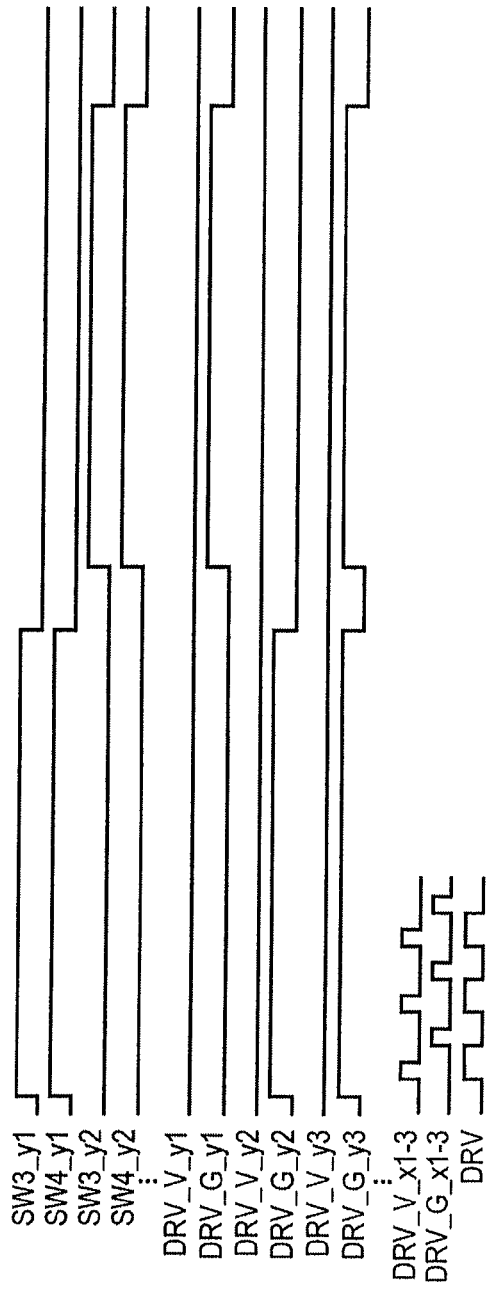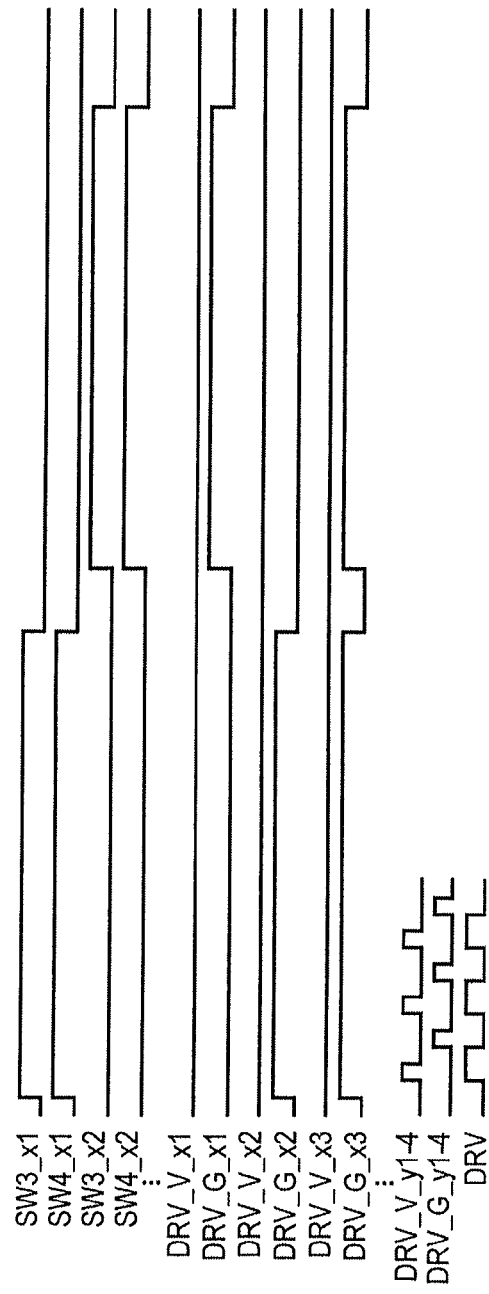

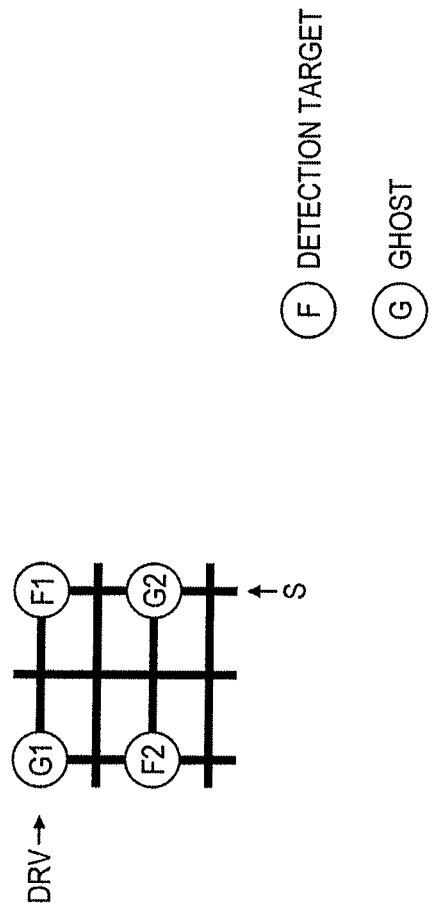
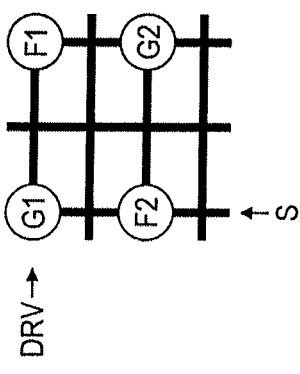
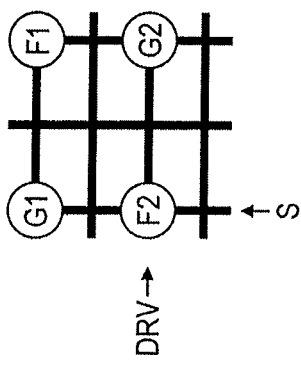
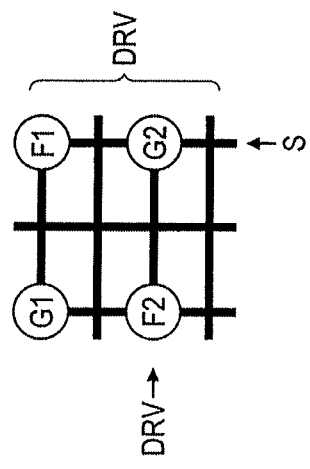

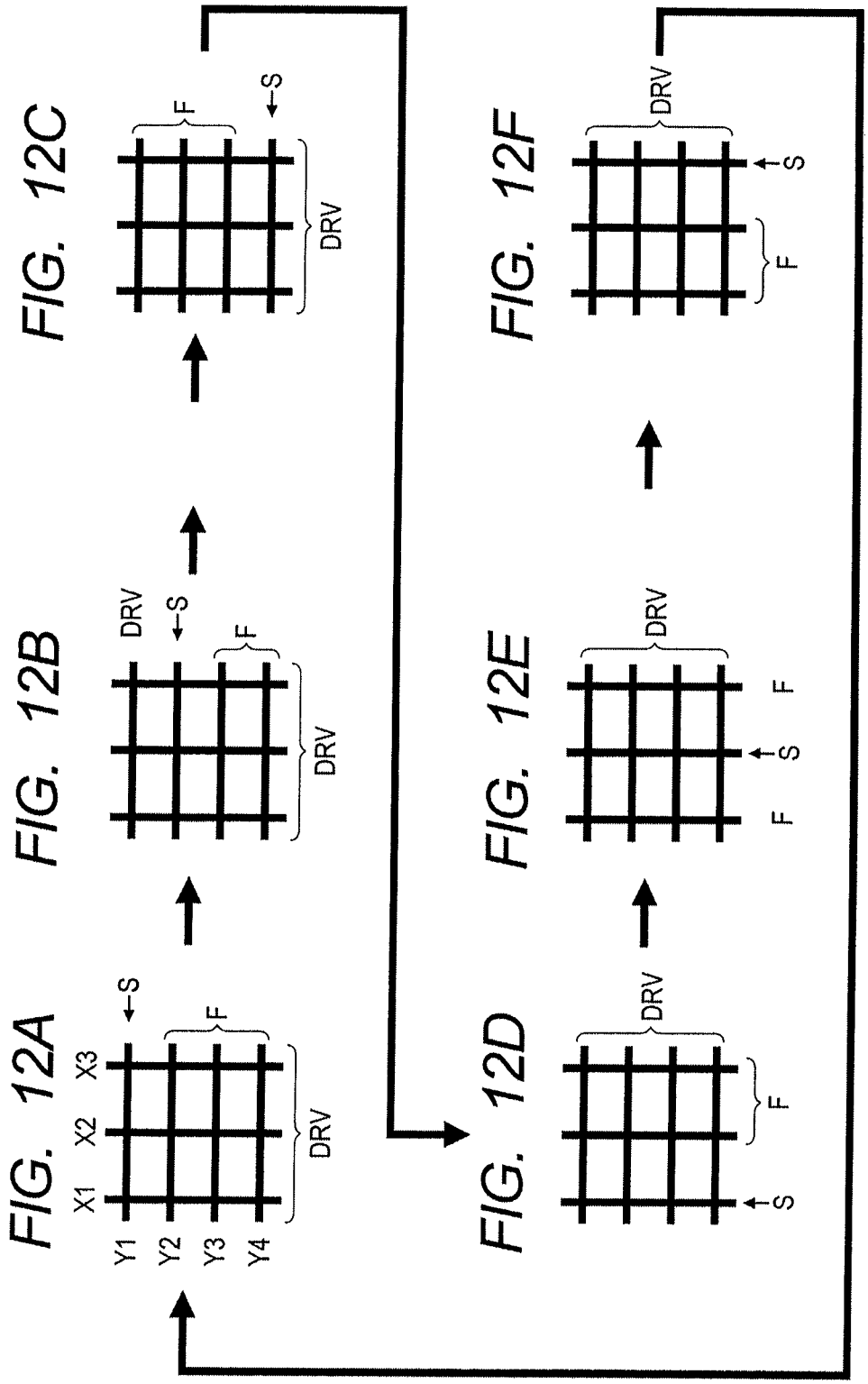

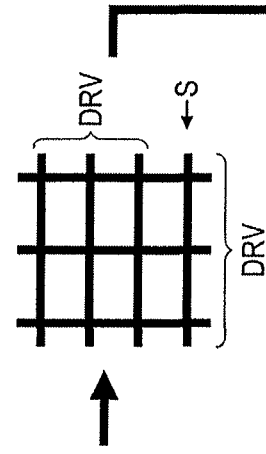
FIG. 14A
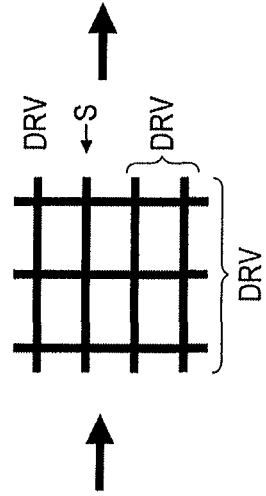
FIG. 14B
FIG. 14C
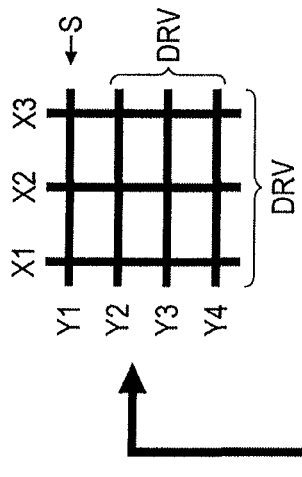
FIG. 14D
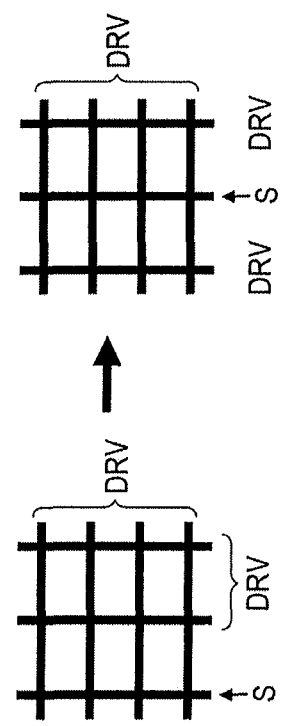
FIG. 14E
FIG. 14F

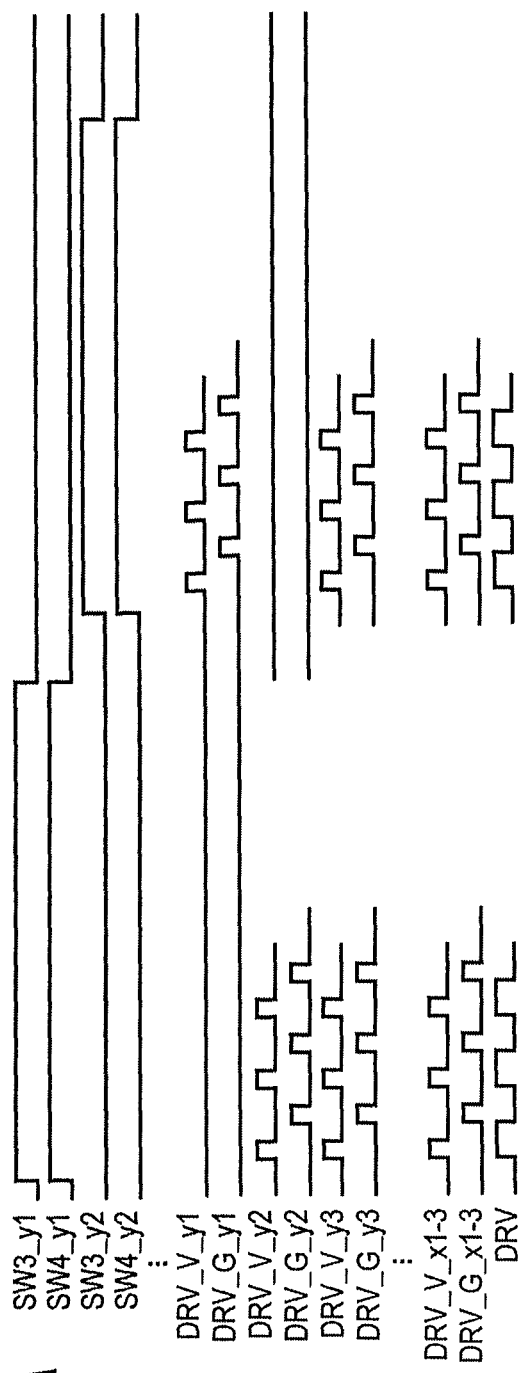
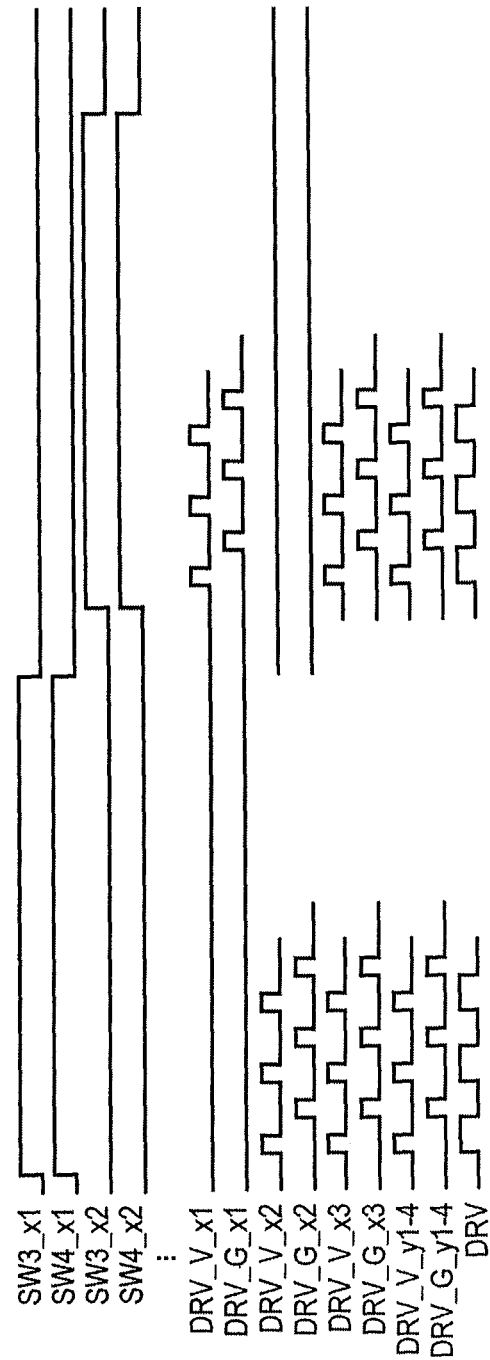
FIG. 15A
FIG. 15B

COORDINATE DETECTING DEVICE

CLAIM OF PRIORITY

This application claims benefit of Japanese Patent Application No. 2011-083320 filed on Apr. 5, 2011, which is hereby incorporated in its entirety by reference.

BACKGROUND

1. Field of the Disclosure

The present disclosure relates to a coordinate detecting device that two-dimensionally detects the approach position of a detection target from a change in electrostatic capacitance.

2. Description of the Related Art

As a coordinate detecting device that two-dimensionally detects the approach position of a detection target, a device has been proposed which detects a change in the electrostatic capacitance formed at the intersection point between detection electrodes arranged in a matrix (for example, see Japanese Unexamined Patent Application Publication No. 3-289715). This type of coordinate detecting device includes first electrodes which are arranged in a first axial direction and second electrodes which are arranged in a second axial direction intersecting the first electrodes and are insulated from the first electrodes, and detects a change in capacitance at the intersection points which is determined by combinations of the first electrodes and the second electrodes, thereby specifying the approach position of the detection target.

The coordinate detecting device detects a change in capacitance at all of the intersection points determined by the combinations of the first electrodes and the second electrodes in order to specify the approach position of the detection target. Therefore, it is easy to improve detection sensitivity or resolution. Even when the detection targets approach a plurality of coordinates, it is possible to accurately obtain information about a plurality of approach points.

However, since the coordinate detecting device detects a change in capacitance for all of the combinations of the first electrodes and the second electrodes, the coordinate detecting device including, for example, m first electrodes and n second electrodes needs to measure capacitance m×n times in one coordinate specifying operation. Therefore, when the number of electrodes increases in order to improve the resolution of the coordinate detecting device, the time required to specify the coordinates increases. On the other hand, a plurality of detecting circuits can be used to measure capacitance at a plurality of intersection points in parallel, thereby reducing the time required to specify the coordinates. However, in this case, the size of the circuit increases, which results in an increase in the manufacturing costs of the coordinate detecting device. When the size of the detecting circuit increases, the power consumption of the coordinate detecting device increases proportionately.

SUMMARY

A coordinate detecting device for two-dimensionally detecting the position of a detection target from a change in capacitance due to the approach of the detection target is disclosed. The coordinate detecting device includes a plurality of first electrodes arranged in a first direction, a plurality of second electrodes which are arranged in a second direction and intersect the plurality of first electrodes, a capacitance detecting circuit selectively connected to the first electrodes or the second electrodes, a first electrode switch configured to connect the first electrode to the capacitance detecting circuit or a power supply for supplying a predetermined voltage, and a second electrode switch configured to connect the second electrode to the capacitance detecting circuit or the power supply. All of the plurality of second electrodes are connected to the power supply by the second electrode switch and the plurality of first electrodes are selectively connected to the capacitance detecting circuit by the first electrode switch, thereby detecting a first coordinate, which is the position of the detection target in the first direction. All of the plurality of first electrodes are connected to the power supply by the first electrode switch and the plurality of second electrodes are selectively connected to the capacitance detecting circuit by the second electrode switch, thereby detecting a second coordinate, which is the position of the detection target in the second direction. When a plurality of first coordinates or a plurality of second coordinates are detected, capacitances between the first electrodes and the second electrodes corresponding to combinations of the detected first and second coordinates are measured, thereby specifying the position of the detection target.

According to the above-mentioned structure, all of the second electrodes are connected to the power supply and the first electrodes are selectively connected to the capacitance detecting circuit, thereby detecting the first coordinate. All of the first electrodes are connected to the power supply and the second electrodes are selectively connected to the capacitance detecting circuit, thereby detecting the second coordinate. When a plurality of first coordinates or a plurality of second coordinates are detected, sets of the first electrode and the second electrodes with different capacitances are specified in the combinations. Therefore, it is not necessary to detect the capacitances of all of the combinations of the first electrodes and the second electrodes. In this way, even when the number of capacitance detecting circuits is small, it is possible to reduce the time required to specify the coordinates. That is, it is possible to achieve a high-resolution coordinate detecting device which has low power consumption and is capable of reducing the time required to specify the coordinates.

In the coordinate detecting device according to the above-mentioned aspect, the first electrode switch may be configured to connect the first electrode to ground and the second electrode switch may be configured to connect the second electrode to the ground. In the detection of the first coordinate, the first electrodes other than the first electrode connected to the capacitance detecting circuit may be connected to the ground. In the detection of the second coordinate, the second electrodes other than the second electrode connected to the capacitance detecting circuit may be connected to the ground.

According to this structure, the electrode which is not connected to the capacitance detecting circuit is connected to the ground. Therefore, it is possible to prevent unnecessary radiation and reduce electromagnetic wave noise. As a result, it is possible to improve the detection accuracy of the coordinate detecting device.

In the coordinate detecting device according to the above-mentioned aspect, the first electrode switch may be configured to insulate the first electrode from other electrical elements and the second electrode switch may be configured to insulate the second electrode from other electrical elements. In the detection of the first coordinate, the first electrodes other than the first electrode connected to the capacitance detecting circuit may be insulated from other electrical elements. In the detection of the second coordinate, the second electrodes other than the second electrode connected to the capacitance detecting circuit may be insulated from other electrical elements.

According to this structure, the electrode which is not connected to the capacitance detecting circuit is in a floating state. Therefore, it is possible to reduce the ground capacitance of the electrode connected to the capacitance detecting circuit. As a result, it is possible to improve the detection accuracy of the coordinate detecting device. In addition, since a driving current is reduced, it is possible to further reduce power consumption.

In the coordinate detecting device according to the above-mentioned aspect, in the detection of the first coordinate, the first electrodes other than the first electrode connected to the capacitance detecting circuit may be connected to the power supply. In the detection of the second coordinate, the second electrodes other than the second electrode connected to the capacitance detecting circuit may be connected to the power supply.

According to this structure, the electrode which is not connected to the capacitance detecting circuit is connected to the power supply. Therefore, the capacitance value between the electrode connected to the capacitance detecting circuit and the electrode connected to the power supply increases and it is possible to increase electric field stimulation. As a result, it is possible to increase the sensitivity of the coordinate detecting device and improve resistance to foreign noise.

According to the invention, it is possible to provide a coordinate detecting device which has high resolution and low power consumption and is capable of reducing the time required to specify the coordinates.

BRIEF DESCRIPTION OF THE DRAWINGS

FIGS. 6A to 6F are schematic diagrams illustrating an aspect (first aspect) of the detection operation of the coordinate detecting device according to this embodiment;

FIGS. 7A and 7B are timing charts illustrating the aspect (first aspect) of the detection operation of the coordinate detecting device according to this embodiment;

FIGS. 10A to 10D are schematic diagrams illustrating a step of remeasuring a capacitance value;

FIGS. 12A to 12F are schematic diagrams illustrating another aspect (second aspect) of the detection operation of the coordinate detecting device according to this embodiment;

FIGS. 14A to 14F are schematic diagrams illustrating another aspect (third aspect) of the detection operation of the coordinate detecting device according to this embodiment;

FIGS. 15A and 15B are timing charts illustrating another aspect (third aspect) of the detection operation of the coordinate detecting device according to this embodiment.

DESCRIPTION OF THE EXEMPLARY EMBODIMENTS

Hereinafter, the structure of a coordinate detecting device according to an embodiment of the invention will be described with reference to the accompanying drawings.

Figure 1:
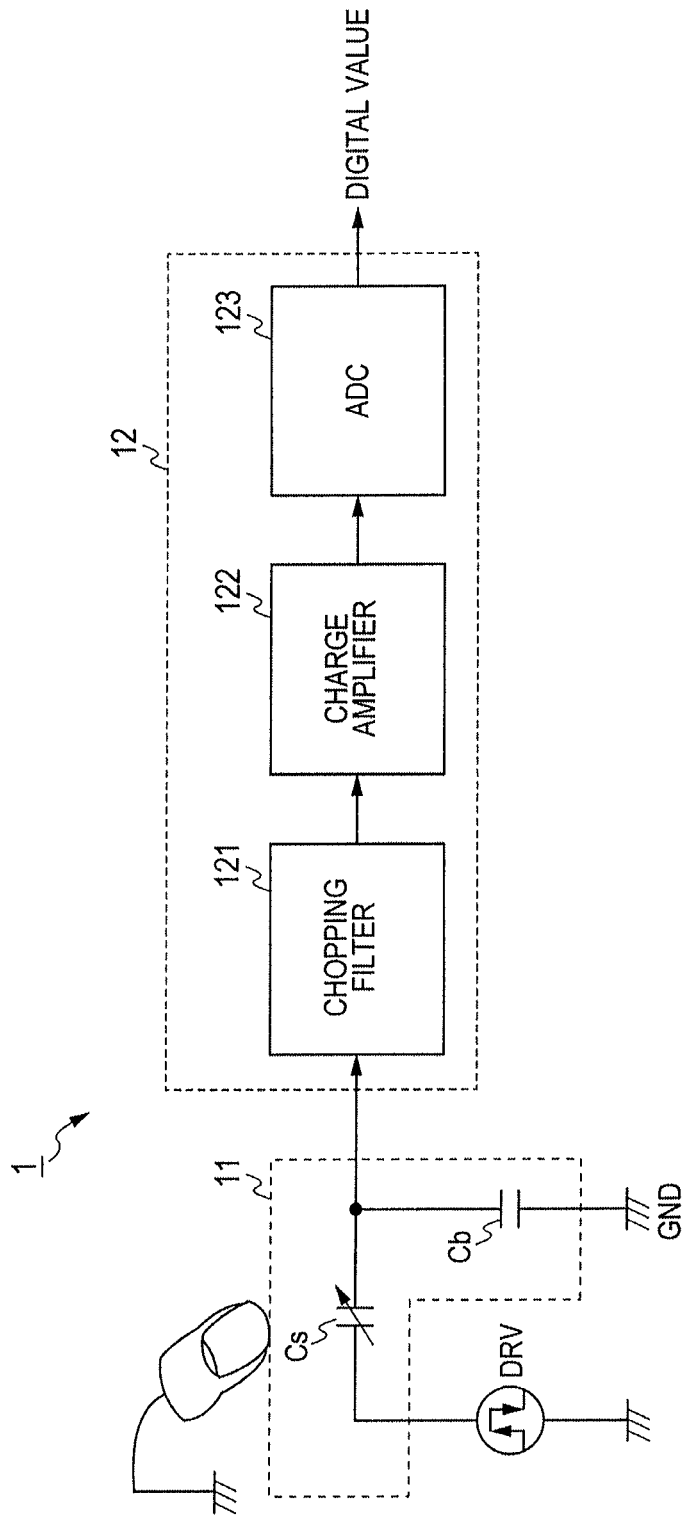
FIG. 1 is a block diagram illustrating an example of the structure of a coordinate detecting device according to an embodiment.

FIG. 1 is a block diagram illustrating an example of the structure the coordinate detecting device according to this embodiment. A coordinate detecting device 1 shown in FIG. 1 includes a sensor 11 including a plurality of electrodes and a detecting circuit 12, which is provided in the rear stage of the sensor 11. The detecting circuit 12 includes a chopping filter 121 that converts low-frequency foreign noise into high-frequency noise and reduces noise amplitude, a charge amplifier 122 that acquires charge transmitted from the chopping filter 121 plural times and converts the charge into an analog voltage, and an ADC 123 that converts the analog voltage into a multi-bit digital signal.

The sensor 11 includes two kinds of electrodes which intersect each other and is configured such that the capacitance between a detection target (for example, a finger of the operator) which approaches the intersection point and one of the electrodes is added in parallel to the capacitance Cf between the electrodes and the apparent capacitance between the electrodes is changed. The change in the capacitance due to the approach of the detection target is detected by the detecting circuit 12 in the rear stage.

The chopping filter 121 converts the capacitance detected by the sensor 11 into the quantity of charge and acquires the quantity of charge. The charge amplifier 122 includes, for example, an operational amplifier, acquires the obtained quantity of charge plural times, integrates the quantity of charge in order to amplify it into a necessary voltage level, and averages the quantity of charge in order to reduce foreign noise. The ADC 123 converts the amplified and averaged analog voltage into a digital signal.

Figure 2:
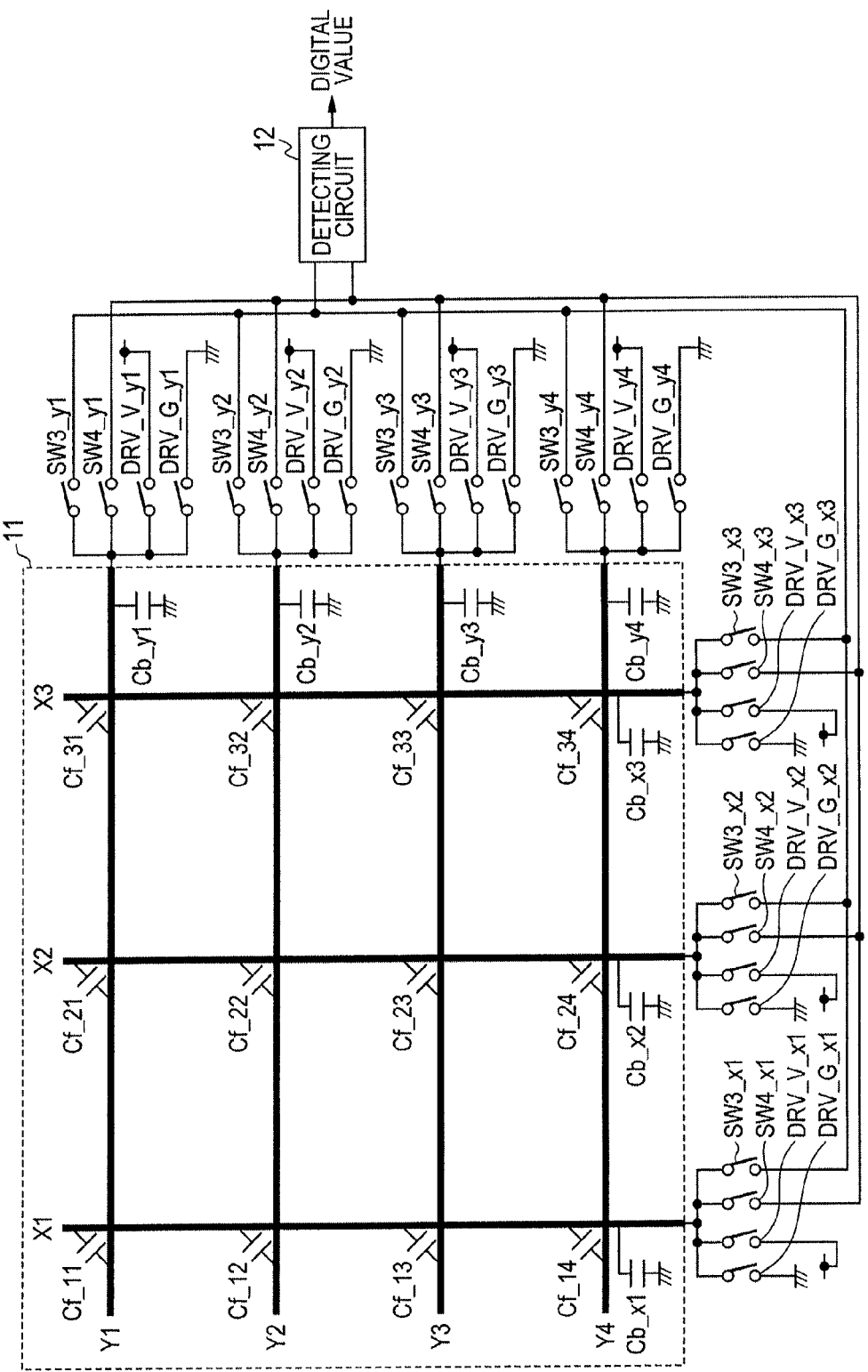
FIG. 2 is a schematic diagram illustrating an example of the structure of a sensor according to this embodiment.

FIG. 2 is a schematic diagram illustrating an example of the structure of the sensor 11 shown in FIG. 1. As shown in FIG. 2, the sensor 11 includes a plurality of first electrodes X1 to X3, which are arranged in a predetermined direction and a plurality of second electrodes Y1 to Y4 which are arranged in a direction different from that in which the first electrodes X1 to X3 are arranged and intersect the first electrodes X1 to X3. In this embodiment, three first electrodes and four second electrodes are arranged. However, the number of electrodes included in the sensor 11 is not limited thereto.

The first electrodes X1 to X3 and the second electrodes Y1 to Y4 are insulated from each other and inter-electrode capacitances Cf_11 to Cf_34 are formed in the vicinities of the intersection points therebetween. Capacitances Cb_x1 to Cb_x3 are formed between the first electrodes X1 to X3 and the ground and capacitances Cb_y1 to Cb_y4 are formed between the second electrodes Y1 to Y4 and the ground. Switches SW3_x1 to SW3_x3 and switches SW4_x1 to SW4_x3 which control connection to the detecting circuit 12 in the rear stage, switches DRV_V_x1 to DRV_V_x3 which control connection to a voltage Vdd, and switches DRV_G_x1 to DRV_G_x3 which control connection to the ground are provided at one end of each of the first electrodes X1 to X3. The switches DRV_V_x1 to DRV_V_x3 and the switches DRV_G_x1 to DRV_G_x3 are alternately turned on and off to apply a pulse voltage DRV to the first electrodes X1 to X3. In addition, switches SW3_y1 to SW3_y4 and switches SW4_y1 to SW4_y4 which control connection to the detecting circuit, switches DRV_V_y1 to DRV_V_y4 which control connection to the voltage Vdd, and switches DRV_G_y1 to DRV_G_y4 which control connection to the ground are provided at one end of each of the second electrodes Y1 to Y4. The switches DRV_V_y1 to DRV_V_y4 and the switches DRV_G_y1 to DRV_G_y4 are alternately turned on and off to apply the pulse voltage DRV to the second electrodes Y1 to Y4.

Figure 3:
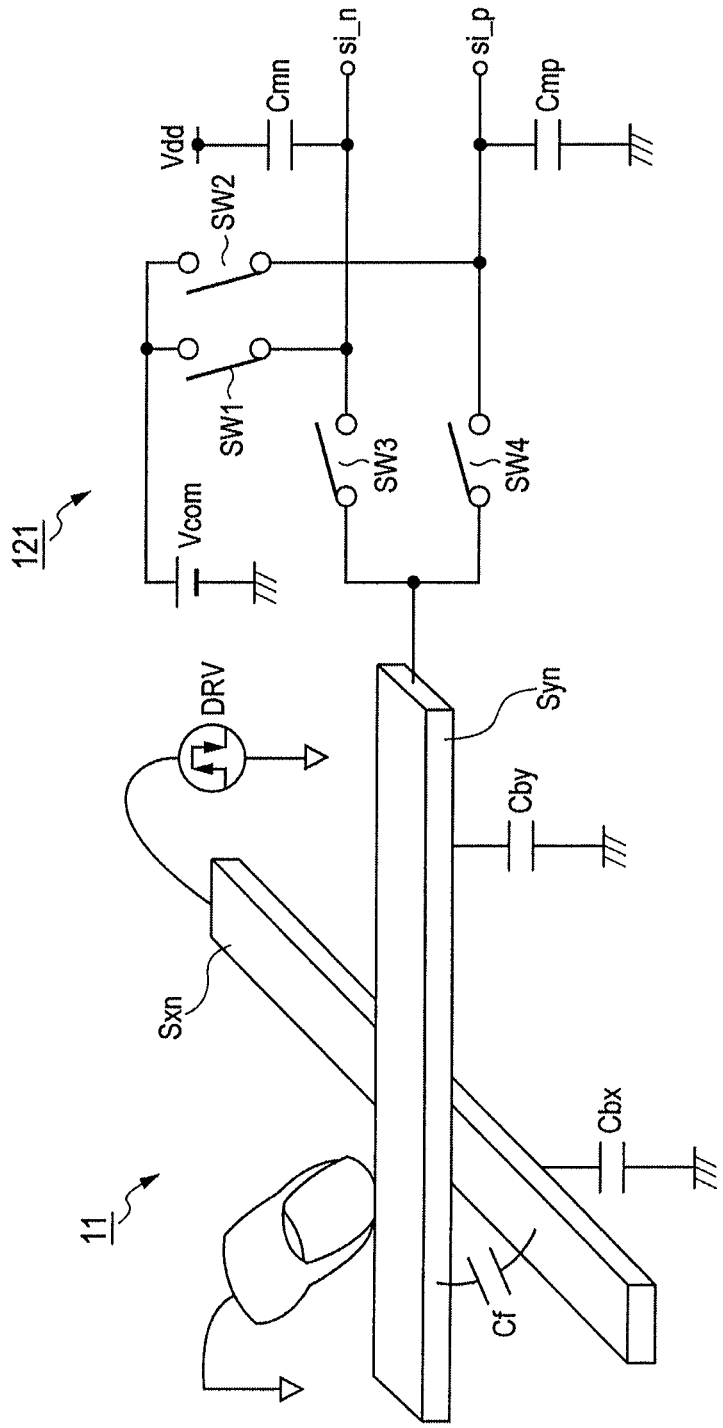
FIG. 3 is a schematic diagram illustrating the sensor and a chopping filter according to this embodiment.

FIG. 3 is a schematic diagram illustrating the sensor 11 and the chopping filter 121 of the coordinate detecting device 1. As shown in FIG. 3, a capacitance Cf is formed between a first electrode Sxn and a second electrode Syn of the sensor 11. The pulse voltage DRV is applied to one of the electrodes (the first electrode Sxn in FIG. 3) and a voltage Vcom is applied to the other electrode (the second electrode Syn in FIG. 3) through the switch SW1 and the switch SW3, or the switch SW2 and the switch SW4. The value of the voltage Vcom is between the voltage Vdd and the ground (GND). In some cases, the relationship between the voltages applied to the first electrode Sxn and the second electrode Syn is changed depending on operations.

One terminal of a capacitance Cmn is connected to the switch SW3 and the voltage Vdd is connected to the other terminal of the capacitance Cmn. One terminal of a capacitance Cmp is connected to the switch SW4 and the ground is connected to the other terminal of the capacitance Cmp. In this case, one end of each of the capacitances Cmn and Cmp is connected to the voltage Vdd or the ground. However, it may be connected to any fixed potential. In the coordinate detecting device 1 having the above-mentioned structure, when a detection target, such as a finger, approaches one of the electrodes (the second electrode Syn in FIG. 3), the capacitance between the electrode and the detection target is added in parallel to the inter-electrode capacitance Cf and the apparent inter-electrode capacitance is reduced. When the reduction in the capacitance is detected, it is possible to specify the two-dimensional coordinates of the detection target.

Figure 4:
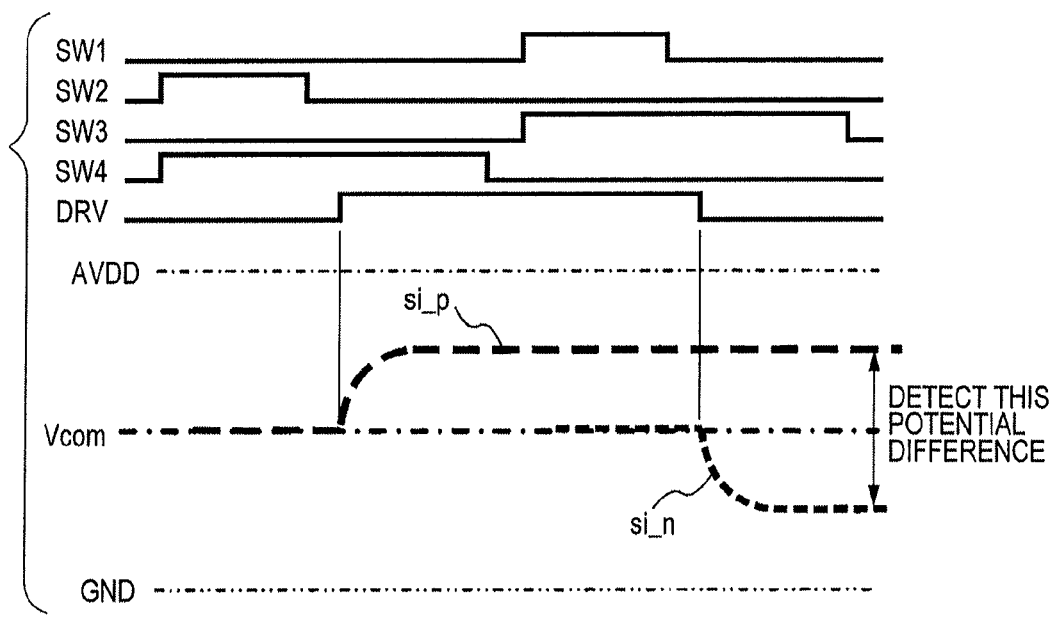
FIG. 4 is a timing chart illustrating the operation of the chopping filter according to this embodiment.

FIG. 4 is a timing chart illustrating the operation of the chopping filter 121 shown in FIG. 3. In the chopping filter 121 shown in FIG. 3, when the switch SW2 and the switch SW4 are turned on, the first output si_p of the chopping filter 121 becomes the voltage Vcom. When the pulse voltage DRV changes to a high level after the switch SW2 is turned off, the first output si_p of the chopping filter 121 increases to a voltage corresponding to sensor capacitance and is then stabilized. Then, when the switch SW4 is turned off and the switches SW1 and SW3 are turned on, the second output si_n of the chopping filter 121 becomes the voltage Vcom. When the pulse voltage DRV changes to a low level after the switch SW1 is turned off, the second output si_n of the chopping filter 121 is reduced to a voltage corresponding to the sensor capacitance and is then stabilized. The difference between the voltage of the first output si_p and the voltage of the second output si_n is detected by the charge amplifier 122 in the rear stage. The waveforms of the first output si_p and the second output si_n vary depending on the magnitudes of the capacitances Cf, Cb, Cmp, and Cmn.

Figure 5:
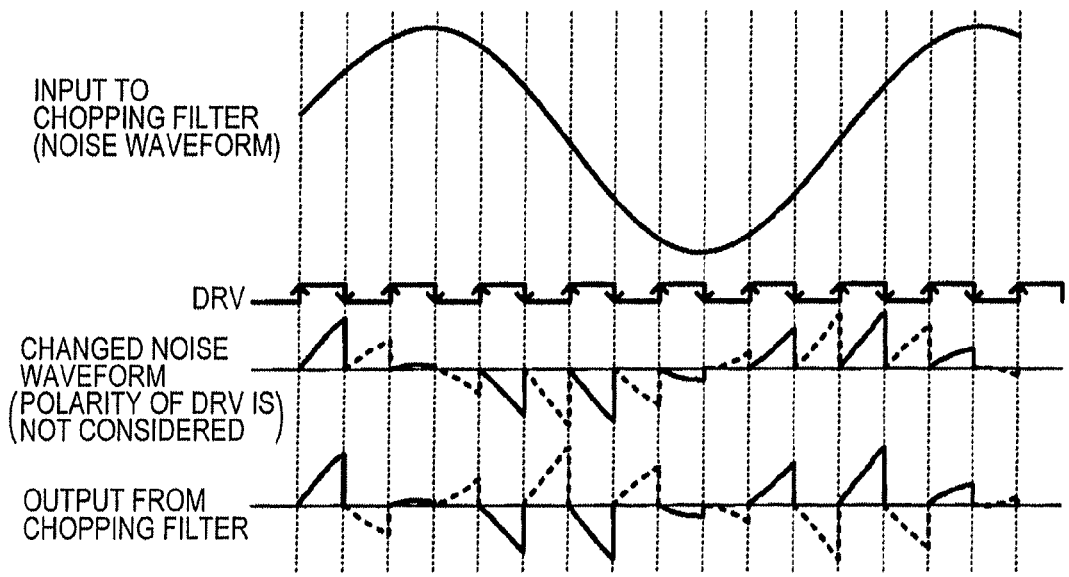
FIG. 5 is a schematic diagram illustrating an aspect in which low-frequency noise is converted into high-frequency nose by the chopping filter according to this embodiment.

FIG. 5 is a schematic diagram illustrating an aspect in which noise from the sensor 11 is converted into a high frequency by the chopping filter 121. It is assumed that the low-frequency noise shown in FIG. 5 is input to the chopping filter 121. The amplitude of the noise is suppressed and converted into high-frequency noise by the chopping filter 121. The polarity of the converted noise output from the chopping filter 121 is determined by the polarity of the pulse voltage DRV. Therefore, it is possible to average the output from the chopping filter 121 using the charge amplifier 122 in the rear stage and thus significantly reduce the influence of noise.

Next, the detection operation of the coordinate detecting device 1 will be described with reference to FIGS. 6 to 15.

FIGS. 6A and 6F are schematic diagrams illustrating an aspect of the detection operation of the coordinate detecting device 1. FIGS. 7A and 7B are timing charts illustrating the detection operation. As shown in FIGS. 6A and 7A, first, the capacitances between the second electrode Y1 and the first electrodes X1 to X3 are measured. The switches SW3_y1 and SW4_y1 (see FIG. 2) are turned on to connect the second electrode Y1 to the detecting circuit 12. The switches DRV_V_y2 to DRV_V_y4 are turned off and the switches DRV_G_y2 to DRV_G_y4 are turned on to connect the second electrodes Y2 to Y4 other than the second electrode Y1 related to the measurement of the capacitance to the ground. The switches DRV_V_x1 to DRV_V_x3 and the switches DRV_G_x1 to DRV_G_x3 are alternately turned on and off to apply the same pulse voltage DRV to the first electrodes X1 to X3. The switches DRV_V_x1 to DRV_V_x3 perform the same operation and the switches DRV_G_x1 to DRV_G_x3 perform the same operation. The capacitance values between the second electrode Y1 and the first electrodes X1 to X3 are measured by the above-mentioned operation.

Then, as shown in FIGS. 6B and 7A, the capacitances between the second electrode Y2 and the first electrodes X1 to X3 are measured. Similarly to the second electrode Y1, the switches SW3_y2 and SW4_y2 (see FIG. 2) are turned on to connect the second electrode Y2 to the detecting circuit 12. The switches DRV_V_y1, DRV_V_y3, and DRV_V_y4 are turned off and the switches DRV_G_y1, DRV_G_y3, and DRV_G_y4 are turned on to connect the second electrodes Y1, Y3, and Y4 other than the second electrode Y2 related to the measurement of the capacitance to the ground. The switches DRV_V_x1 to DRV_V_x3 and the switches DRV_G_x1 to DRV_G_x3 are alternately turned on and off to apply the same pulse voltage DRV to the first electrode X1 to X3. The switches DRV_V_x1 to DRV_V_x3 perform the same operation and the switches DRV_G_x1 to DRV_G_x3 perform the same operation. The capacitance values between the second electrode Y2 and the first electrodes X1 to X3 are measured by the above-mentioned operation. Then, similarly to the second electrodes Y1 and Y2, the capacitances between the second electrode Y3 and the first electrodes X1 to X3 are measured (not shown) and the capacitances between the second electrode Y4 and the first electrodes X1 to X3 are measured (FIG. 6C).

Then, as shown in FIGS. 6D and 7B, the capacitances between the first electrode X1 and the second electrodes Y1 to Y4 are measured. The switches SW3_x1 and SW4_x1 (see FIG. 2) are turned on to connect the first electrode X1 to the detecting circuit 12. The switches DRV_V_x2 and DRV_V_x3 are turned off and the switches DRV_G_x2 and DRV_G_x3 are turned on to connect the first electrodes X2 and X3 other than the first electrode X1 related to the measurement of the capacitance to the ground. The switches DRV_V_y1 to DRV_V_y4 and the switches DRV_G_y1 to DRV_G_y4 are alternately turned on and off to apply the same pulse voltage DRV to the second electrodes Y1 to Y4. The capacitance values between the first electrode X1 and the second electrodes Y1 to Y4 are measured by the above-mentioned operation. Similarly, the capacitances between the first electrode X2 and the second electrodes Y1 to Y4 are measured (FIG. 6E) and the capacitances between the first electrode X3 and the second electrodes Y1 to Y4 are measured (FIG. 6F).

The capacitance values between the first electrodes X1 to X3 and the second electrodes Y1 to Y4 and the capacitance values between the second electrodes Y1 to Y4 and the first electrodes X1 to X3 are measured by the above-mentioned detection operation, and one cycle of capacitance the measurement ends. As shown in FIGS. 6A to 4F and FIGS. 7A and 7B, the electrodes other than the electrode related to the measurement of capacitance are connected to the ground. Therefore, it is possible to prevent unnecessary radiation and reduce electromagnetic wave noise. In this way, it is possible to improve the detection accuracy of the coordinate detecting device, which is preferable.

In the above-mentioned detection operation, the pulse voltage DRV is applied to all of the first electrodes X1 to X3 to sequentially connect the second electrodes Y1 to Y4 to the detecting circuit 12, and the pulse voltage DRV is applied to all of the second electrodes Y1 to Y4 to sequentially connect the first electrodes X1 to X3 to the detecting circuit 12. However, the detection operation is not limited thereto. The pulse voltage DRV may be applied to all of the first electrodes X1 to X3 to selectively connect the second electrodes Y1 to Y4 to the detecting circuit 12 and the pulse voltage DRV may be applied to all of the second electrodes Y1 to Y4 to selectively connect the first electrodes X1 to X3 to the detecting circuit 12. That is, it is not necessary to detect capacitance in the order in which the electrodes are arranged. In addition, the capacitance detecting operation is not performed on all the electrodes, but may be performed only on a predetermined electrode.

As the measurement result of the capacitance, when the capacitance value is not reduced in each electrode, it is determined that the detection target does not approach the sensor 11.

Figure 8:
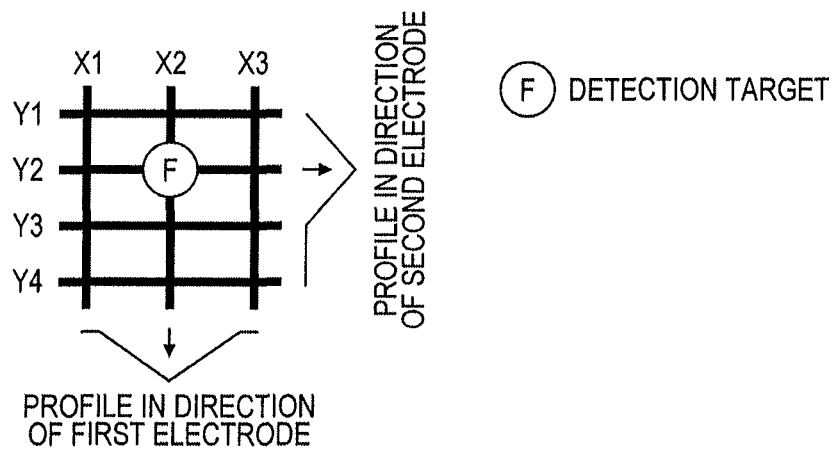
FIG. 8 is a schematic diagram illustrating an aspect in which a detection target approaches an intersection point between a first electrode and a second electrode.

When the capacitance value of any one of the first electrodes X1 to X3 and the capacitance value of any one of the second electrodes Y1 to Y4 are reduced, the coordinates of the approach point of the detection target are specified from the intersection point between the first electrode whose capacitance value is reduced and the second electrode whose capacitance value is reduced. FIG. 8 is a schematic diagram illustrating an aspect in which the detection target approaches the intersection point between the first electrode X2 and the second electrode Y2. As shown in FIG. 8, the capacitance value of the first electrode X2 is less than that of the other first electrodes X1 and X3 in the direction in which the first electrodes are arranged. The capacitance value of the second electrode Y2 is less than that of the other second electrodes Y1, Y3 and Y4 in the direction in which the second electrodes are arranged. As such, the coordinates of the approach point of the detection target can be specified from the intersection point between the first electrode X2 whose capacitance value is reduced and the second electrode Y2 whose capacitance value is reduced.

Figure 9:
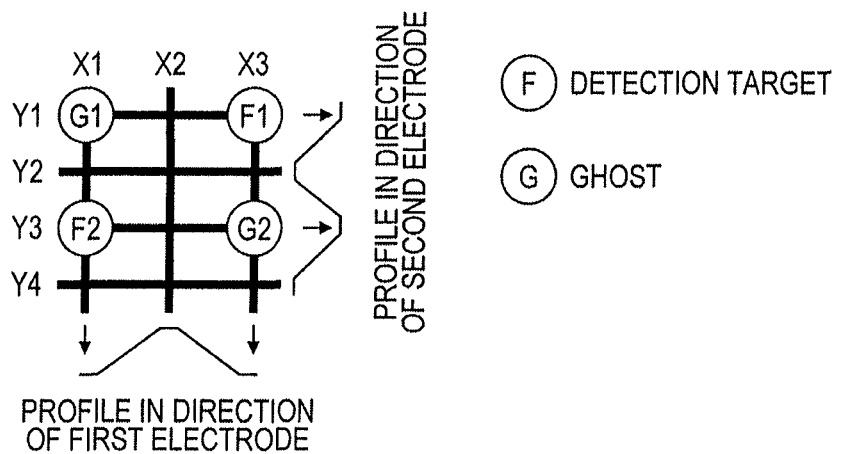
FIG. 9 is a schematic diagram illustrating an aspect in which detection targets approach two intersection points.

FIG. 9 is a schematic diagram illustrating an aspect in which the detection targets approaches the intersection point between the first electrode X1 and the second electrode Y3 and the intersection point between the first electrode X3 and the second electrode Y1. As such, when a plurality of detection targets (two detection targets in this example) approach the sensor 11 and the capacitance values of a plurality of first electrodes or the capacitance values of a plurality of second electrodes are reduced, it is difficult to specify the coordinates from the intersection point between the electrodes, as shown in FIG. 8. For example, in FIG. 9, the capacitance values of the first electrodes X1 and X3 and the second electrodes Y1 and Y3 are reduced, but the coordinates specified by the combination of the electrodes are coordinates (X1, Y3) and (X3, Y1) which the detection targets approach and the coordinates (X1, Y1) and (X3, Y3) which the detection targets do not approach. As such, when the capacitance values of a plurality of first electrodes or a plurality of second electrodes are reduced, it is difficult to specify only the coordinates which the detection targets approach using this method since the coordinates derived from the combination of the first electrodes and the second electrodes include the coordinates which the detection targets do not approach.

In this case, in order to specify only the coordinates of the approach point of the detection target the coordinate detecting device 1 according to this embodiment remeasures the capacitance value for each combination of the first and second electrodes whose capacitance values are reduced. FIGS. 10A to 10D are schematic diagrams illustrating a step of remeasuring the capacitance value. As shown in FIG. 10A, the switches SW3_x1 and SW4_x1 are turned on to connect the first electrode X1 to the detecting circuit 12. In addition, the switch DRV_V_y1 and the switch DRV_G_y1 are alternately turned on and off to apply the pulse voltage DRV to the second electrode Y1. The capacitance value formed by the first electrode X1 and the second electrode Y1 is measured by the above-mentioned operation. As shown in FIG. 10B, the switches SW3_x3 and SW4_x3 are turned on to connect the first electrode X3 to the detecting circuit 12. The switch DRV_V_y1 and the switch DRV_G_y1 are alternately turned on and off to apply the pulse voltage DRV to the second electrode Y1. The capacitance value formed by the first electrode X3 and the second electrode Y1 is measured by the above-mentioned operation. As shown in FIG. 10C, the switches SW3_x1 and SW4_x1 are turned on to connect the first electrode X1 to the detecting circuit 12. The switch DRV_V_y3 and the switch DRV_G_y3 are alternately turned on and off to apply the pulse voltage DRV to the second electrode Y3. The capacitance value formed by the first electrode X1 and the second electrode Y3 is measured by the above-mentioned operation. As shown in FIG. 10D, the switches SW3_x3 and SW4_x3 are turned on to connect the first electrode X3 to the detecting circuit 12. The switch DRV_V_y3 and the switch DRV_G_y3 are alternately turned on and off to apply the pulse voltage DRV to the second electrode Y3. The capacitance value formed by the first electrode X3 and the second electrode Y3 is measured by the above-mentioned operation.

In the remeasurement, the capacitance value formed by the first electrode X1 and the second electrode Y3 and the capacitance value formed by the first electrode X3 and the second electrode Y1 are less than the capacitance value formed by the first electrode X1 and the second electrode Y1 and the capacitance value formed by the first electrode X3 and the second electrode Y3. The reason is that the detection target approaches the coordinates (X1, Y3) of the intersection point between the first electrode X1 and the second electrode Y3 and the coordinates (X3, Y1) of the intersection point between the first electrode X3 and the second electrode Y1 and the capacitance values are reduced by the influence of the approach. As such, when the capacitance values of a plurality of first electrodes or a plurality of second electrodes are reduced, an operation of remeasuring the capacitance value is performed for each combination of the first electrodes and the second electrodes whose capacitance values are reduced. In this way, it is possible to specify the coordinates of the approach point of the detection target.

Figure 11A:
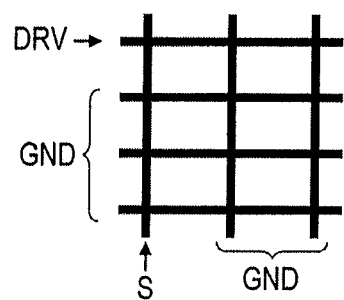
FIGS. 11A and 11B are diagrams illustrating a voltage applied to electrodes other than a measurement target in the remeasuring step.
Figure 11B:
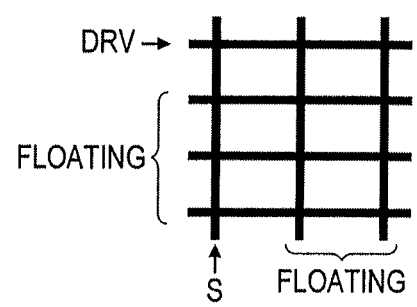

In the remeasuring step, it is preferable that the electrodes other than the first electrodes and the second electrodes, which are measurement targets, be connected to the ground, as shown in FIG. 11A. Alternatively, it is preferable that the electrodes other than the first electrodes and the second electrodes, which are measurement targets, be insulated to be in a floating state, as shown in FIG. 11B.

Figure 13A:
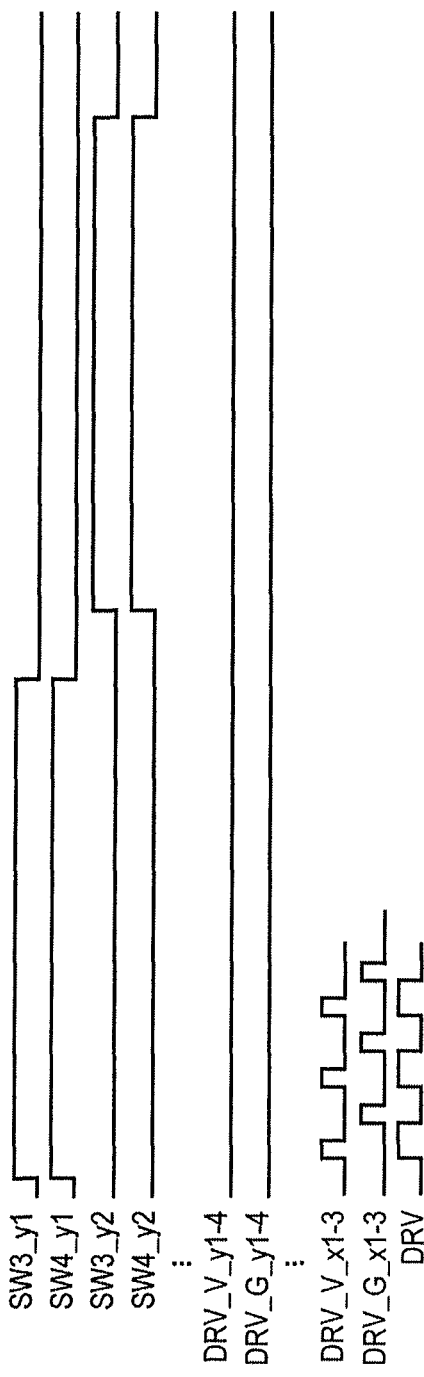
FIGS. 13A and 13B are timing charts illustrating another aspect (second aspect) of the detection operation of the coordinate detecting device according to this embodiment.
Figure 13B:
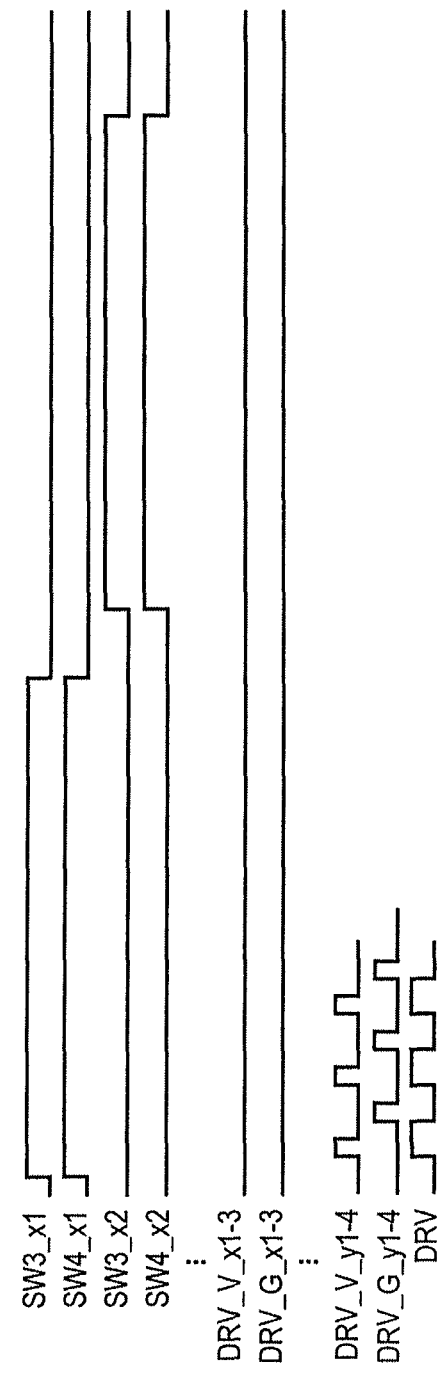

FIGS. 12A to 12F are schematic diagrams illustrating another aspect of the detection operation of the coordinate detecting device 1. FIGS. 13A and 13B are timing charts illustrating the detection operation. As shown in FIGS. 12A and 13A, first, the capacitances between the second electrode Y1 and the first electrodes X1 to X3 are measured. The switches SW3_y1 and SW4_y1 are turned on to connect the second electrode Y1 to the detecting circuit 12. The switches DRV_V_y2 to DRV_V_y4 are turned off and the switches DRV_G_y2 to DRV_G_y4 are turned off to insulate the second electrodes Y2 to Y4 other than the second electrode Y1 related to the measurement of the capacitance from other electrical elements such that the second electrodes Y2 to Y4 are in a floating state. The switches DRV_V_x1 to DRV_V_x3 and the switches DRV_G_x1 to DRV_G_x3 are alternately turned on and off to apply the same pulse voltage DRV to the first electrodes X1 to X3. The capacitance values between the second electrode Y1 and the first electrodes X1 to X3 are measured by the above-mentioned operation.

Then, as shown in FIGS. 12B and 13A, the capacitances between the second electrode Y2 and the first electrodes X1 to X3 are measured. Similarly to the second electrode Y1, the switches SW3_y2 and SW4_y2 are turned on to connect the second electrode Y2 to the detecting circuit 12. The switches DRV_V_y1, DRV_V_y3, and DRV_V_y4 are turned off and the switches DRV_G_y1, DRV_G_y3, and DRV_G_y4 are turned off to insulate the second electrodes Y1, Y3, and Y4 other than the second electrode Y2 related to the measurement of the capacitance from other electrical elements such that the second electrodes Y1, Y3, and Y4 are in a floating state. The switches DRV_V_x1 to DRV_V_x3 and the switches DRV_G_x1 to DRV_G_x3 are alternately turned on and off to apply the same pulse voltage DRV to the first electrodes X1 to X3. The capacitance values between the second electrode Y2 and the first electrodes X1 to X3 are measured by the above-mentioned operation. Then, similarly to the second electrodes Y1 and Y2, the capacitances between the second electrode Y3 and the first electrodes X1 to X3 are measured (not shown) and the capacitances between the second electrode Y4 and the first electrodes X1 to X3 are measured (FIG. 12C).

Then, as shown in FIGS. 12D and 13B, the capacitances between the first electrode X1 and the second electrodes Y1 to Y4 are measured. The switches SW3_x1 and SW4_x1 are turned on to connect the first electrode X1 to the detecting circuit 12. The switches DRV_V_x2 and DRV_V_x3 are turned off and the switches DRV_G_x2 and DRV_G_x3 are turned off to insulate the first electrodes X2 and X3 other than the first electrode X1 related to the measurement of the capacitance from other electrical elements such that the first electrodes X2 and X3 are in a floating state. The switches DRV_V_y1 to DRV_V_y4 and the switches DRV_G_y1 to DRV_G_y4 are alternately turned on and off to apply the same pulse voltage DRV to the second electrodes Y1 to Y4. The capacitance values between the first electrode X1 and the second electrodes Y1 to Y4 are measured by the above-mentioned operation. Similarly, the capacitances between the first electrode X2 and the second electrodes Y1 to Y4 are measured (FIG. 12E) and the capacitances between the first electrode X3 and the second electrodes Y1 to Y4 are measured (FIG. 12F).

The capacitance values between the first electrodes X1 to X3 and the second electrodes Y1 to Y4 and the capacitance values between the second electrodes Y1 to Y4 and the first electrodes X1 to X3 are measured by the above-mentioned detection operation. In this way, one cycle of the measurement of the capacitance ends. As shown in FIGS. 12A to 12F and FIGS. 13A and 13B, since the electrode which is not connected to the detecting circuit 12 is in the floating state, it is possible to reduce the ground capacitance of the electrode connected to the detecting circuit 12. Therefore, it is possible to improve the detection accuracy of coordinates. In addition, since a driving current is reduced, it is possible to further reduce power consumption.

The pulse voltage DRV may be applied to all of the first electrodes X1 to X3 to selectively connect the second electrodes Y1 to Y4 to the detecting circuit 12 and the pulse voltage DRV may be applied to all of the second electrodes Y1 to Y4 to selectively connect the first electrodes X1 to X3 to the detecting circuit 12. In this case, the detection operation is the same as that shown in FIGS. 6A to 6F and FIGS. 7A and 7B.

The following operation is the same as described above. When a reduction in the capacitance value is not detected in each electrode, it is determined that the detection target does not approach the sensor 11. When the capacitance value of any one of the first electrodes X1 to X3 and the capacitance value of any one of the second electrodes Y1 to Y4 are reduced, the coordinates of the approach point of the detection target are specified from the intersection point between the first electrode whose capacitance value is reduced and the second electrode whose capacitance value is reduced. When the capacitance values of a plurality of first electrodes or a plurality of second electrodes are reduced, the coordinates are specified by the remeasuring step. In addition, the remeasuring step may be performed through the same procedure as that of the step shown in FIGS. 10A to 10D.

FIGS. 14A to 14F are schematic diagrams illustrating another aspect of the detection operation of the coordinate detecting device 1. FIGS. 15A and 15B are timing charts illustrating the detection operation. As shown in FIGS. 14A and 15A, first, the capacitances between the second electrode Y1 and the first electrodes X1 to X3 are measured. The switches SW3_y1 and SW4_y1 are turned on to connect the second electrode Y1 to the detecting circuit 12. The switches DRV_V_y2 to DRV_V_y4 and the switches DRV_G_y2 to DRV_G_y4 are alternately turned on and off to apply the same pulse voltage DRV to the second electrodes Y2 to Y4 other than the second electrode Y1 related to the measurement of the capacitance. The switches DRV_V_x1 to DRV_V_3 and the switches DRV_G_x1 to DRV_G_x3 are alternately turned on and off to apply the same pulse voltage DRV to the first electrodes X1 to X3. The capacitance values between the second electrodes Y1 and the first electrodes X1 to X3 are measured by the above-mentioned operation.

Then, as shown in FIGS. 14B and 15A, the capacitances between the second electrode Y2 and the first electrodes X1 to X3 are measured. Similarly to the second electrode Y1, the switches SW3_y2 and SW4_y2 are turned on to connect the second electrode Y2 to the detecting circuit 12. The switches DRV_V_y1, DRV_V_y3, and DRV_V_y4 and the switches DRV_G_y1, DRV_G_y3, and DRV_G_y4 are alternately turned on and off to apply the same pulse voltage DRV to the second electrodes Y1, Y3, and Y4 other than the second electrode Y2 related to the measurement of the capacitance. The switches DRV_V_x1 to DRV_V_x3 and the switches DRV_G_x1 to DRV_G_x3 are alternately turned on and off to apply the same pulse voltage DRV to the first electrodes X1 to X3. The capacitance values between the second electrode Y2 and the first electrodes X1 to X3 are measured by the above-mentioned operation. Then, similarly to the second electrodes Y1 and Y2, the capacitances between the second electrode Y3 and the first electrodes X1 to X3 are measured (not shown) and the capacitances between the second electrode Y4 and the first electrodes X1 to X3 are measured (FIG. 14C).

Then, as shown in FIGS. 14D and 15B, the capacitances between the first electrode X1 and the second electrodes Y1 to Y4 are measured. The switches SW3_x1 and SW4_x1 are turned on to connect the first electrode X1 to the detecting circuit 12. The switches DRV_V_x2 and DRV_V_x3 and the switches DRV_G_x2 and DRV_G_x3 are alternately turned on and off to apply the same pulse voltage DRV to the first electrodes X2 and X3 other than the first electrode X1 related to the measurement of the capacitance. The switches DRV_V_y1 to DRV_V_y4 and the switches DRV_G_y1 to DRV_G_y4 are alternately turned on and off to apply the same pulse voltage DRV to the second electrodes Y1 to Y4. The capacitance values between the first electrode X1 and the second electrodes Y1 to Y4 are measured by the above-mentioned operation. Similarly, the capacitances between the first electrode X2 and the second electrodes Y1 to Y4 are measured (FIG. 14E) and the capacitances between the first electrode X3 and the second electrodes Y1 to Y4 are measured (FIG. 14F).

The capacitance values between the first electrodes X1 to X3 and the second electrodes Y1 to Y4 and the capacitance values between the second electrodes Y1 to Y4 and the first electrodes X1 to X3 are measured by the above-mentioned detection operation. In this way, one cycle of capacitance measurement ends. As shown in FIGS. 14A to 14F and FIGS. 15A and 15B, when the electrode which is not connected to the detecting circuit 12 is connected to a power supply, the capacitance value between the electrode connected to the detecting circuit 12 and the electrode connected to the power supply increases and it is possible to increase electric field stimulation. Therefore, it is possible to increase the sensitivity of the coordinate detecting device and improve resistance to foreign noise.

The pulse voltage DRV may be applied to all of the first electrodes X1 to X3 to selectively connect the second electrodes Y1 to Y4 to the detecting circuit 12 and the pulse voltage DRV may be applied to all of the second electrodes Y1 to Y4 to selectively connect the first electrodes X1 to X3 to the detecting circuit 12. In this case, the detection operation is the same as that shown in FIGS. 6A to 6F and FIGS. 7A and 7B.

The following operation is the same as described above. When a reduction in the capacitance value is not detected in each electrode, it is determined that the detection target does not approach the sensor 11. When the capacitance value of any one of the first electrodes X1 to X3 and the capacitance value of any one of the second electrodes Y1 to Y4 are reduced, the coordinates of the approach point of the detection target are specified from the intersection point between the first electrode whose capacitance value is reduced and the second electrode whose capacitance value is reduced. When the capacitance values of a plurality of first electrodes or a plurality of second electrodes are reduced, the coordinates are specified by the remeasuring step. In addition, the remeasuring step may be performed through the same procedure as that of the step shown in FIGS. 10A to 10D.

Figure 16:
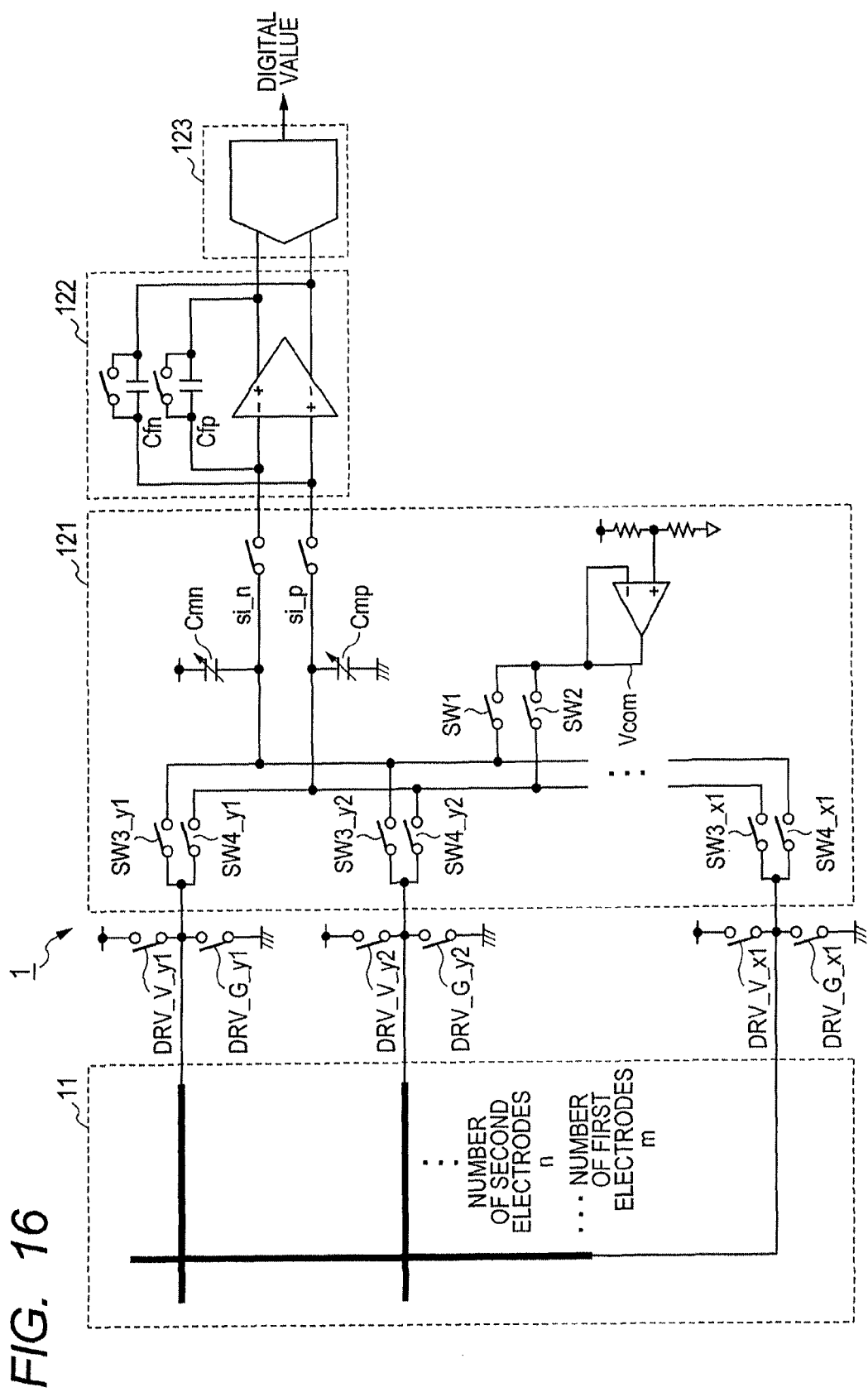
FIG. 16 is a circuit diagram illustrating an example of the detailed structure of the coordinate detecting device according to this embodiment.

FIG. 16 is a circuit diagram illustrating an example of the detailed structure of the coordinate detecting device 1. In the coordinate detecting device 1 shown in FIG. 16, the sensor 11 is connected to the detecting circuit 12 through the switches SW3_x1 to SW3_xn and the switches SW4_x1 to SW4_xn (n is the number of first electrodes) and a portion of the quantity of charge of the sensor 11 is transmitted to the chopping filter 121. This operation has been described with reference to FIGS. 3 and 4.

The charge amplifier 122 is a fully-differential operational amplifier and transmits the quantity of charge which is determined by the potential difference between the outputs si_n and si_p of the chopping filter 121 to the capacitors Cfn and Cfp. The charge amplifier 122 may transmit the charge from the chopping filter plural times, integrate the charge, amplify the output voltage from the charge amplifier to a necessary level, and set the amplified voltage as the output from the charge amplifier.

The ADC 123 converts the analog voltage output from the charge amplifier 122 into a multi-bit digital value and is a $\Delta\Sigma$ type or a successive approximation type.

As described above, in the coordinate detecting device 1 according to the embodiment of the invention, all of the first electrodes are connected to the power supply and the second electrodes are selectively connected to the detecting circuit 12, thereby detecting the coordinates in the direction in which the second electrodes are arranged. All of the second electrodes are connected to the power supply and the first electrodes are selectively connected to the detecting circuit 12, thereby detecting the coordinates in the direction in which the first electrodes are arranged. The remeasuring step is performed only when a plurality of first coordinates or second coordinates with different capacitance values are detected. Therefore, it is possible to specify the coordinates without measuring the capacitances of all of the combinations of the first electrodes and the second electrodes. In this way, it is possible to reduce the time required to specify the coordinates even when the number of detecting circuits is small. That is, it is possible to achieve a high-resolution coordinate detecting device which has low power consumption and is capable of reducing the time required to specify the coordinates.

The invention is not limited to the above-described embodiment, but can be appropriately changed to aspects capable of obtaining the effect of the embodiment. For example, the number of electrodes in the sensor may be changed depending on the area or resolution of the sensor. In addition, the number of detecting circuits is not limited to one, but a plurality of detecting circuits may be provided. When the plurality of detecting circuits are provided, it is possible to further reduce the time required to specify the coordinates.

The coordinate detecting device according to the embodiment of the invention is useful as, for example, an input device, such as a touch pad.

It should be understood by those skilled in the art that various modifications, combinations, sub-combinations and alterations may occur depending on design requirements and other factors insofar as they are within the scope of the appended claims of the equivalents thereof.

What is claimed is:
1. A coordinate detecting device for two-dimensionally detecting the position of a detection target from a change in capacitance due to the approach of the detection target, comprising:
a plurality of first electrodes arranged in a first direction;

a plurality of second electrodes arranged in a second direction and intersecting the plurality of first electrodes;

a capacitance detecting circuit selectively connected to the first electrodes or the second electrodes;

a first electrode switch configured to connect the first electrode to the capacitance detecting circuit or a power supply that supplies a predetermined voltage; and a second electrode switch configured to connect the second electrode to the capacitance detecting circuit or the power supply, wherein all of the plurality of second electrodes are connected to the power supply by the second electrode switch and the plurality of first electrodes are selectively connected to the capacitance detecting circuit by the first electrode switch, thereby detecting a first coordinate, which is the position of the detection target in the first direction, wherein all of the plurality of first electrodes are connected to the power supply by the first electrode switch and the plurality of second electrodes are selectively connected to the capacitance detecting circuit by the second electrode switch, thereby detecting a second coordinate, which is the position of the detection target in the second direction, and wherein when a plurality of first coordinates or a plurality of second coordinates are detected, capacitances between the first electrodes and the second electrodes corresponding to combinations of the detected first and second coordinates are measured, thereby specifying the position of the detection target.

2. The coordinate detecting device according to claim 1, wherein:

the first electrode switch is configured to connect the first electrode to ground, the second electrode switch is configured to connect the second electrode to the ground, in the detection of the first coordinate, the first electrodes other than the first electrode connected to the capacitance detecting circuit are connected to the ground, and in the detection of the second coordinate, the second electrodes other than the second electrode connected to the capacitance detecting circuit are connected to the ground.

3. The coordinate detecting device according to claim 1, wherein:

the first electrode switch is configured to insulate the first electrode from other electrical elements, the second electrode switch is configured to insulate the second electrode from other electrical elements, in the detection of the first coordinate, the first electrodes other than the first electrode connected to the capacitance detecting circuit are insulated from other electrical elements, and in the detection of the second coordinate, the second electrodes other than the second electrode connected to the capacitance detecting circuit are insulated from other electrical elements.

4. The coordinate detecting device according to claim 1, wherein:

in the detection of the first coordinate, the first electrodes other than the first electrode connected to the capacitance detecting circuit are connected to the power supply, and in the detection of the second coordinate, the second electrodes other than the second electrode connected to the capacitance detecting circuit are connected to the power supply.

* * * * *